United States Patent
Kammerer et al.

(10) Patent No.: US 6,779,507 B2
(45) Date of Patent: Aug. 24, 2004

(54) METHOD AND ARRANGEMENT FOR DETERMINING A DRIVER COMMAND

(75) Inventors: Marcus Kammerer, Bondorf (DE); Andreas Schmidt, Muehlacker (DE); Thomas Frey, Hassmersheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/268,937

(22) Filed: Oct. 11, 2002

(65) Prior Publication Data

US 2003/0070656 A1 Apr. 17, 2003

(30) Foreign Application Priority Data

Oct. 11, 2001 (DE) .......................................... 101 50 422

(51) Int. Cl.[7] .................................................. F02D 9/00
(52) U.S. Cl. ...................... 123/396; 477/120; 180/179; 123/399; 123/492
(58) Field of Search ................................ 123/399, 396, 123/492, 361; 477/120; 180/179

(56) References Cited

U.S. PATENT DOCUMENTS

| | | | | |
|---|---|---|---|---|
| 4,470,396 A | * | 9/1984 | Hasumi et al. ............. | 123/399 |
| 4,597,049 A | * | 6/1986 | Murakami ................... | 123/352 |
| 4,771,752 A | * | 9/1988 | Nishimura et al. ......... | 123/399 |
| 4,849,896 A |   | 7/1989 | Bürk et al. |  |
| 4,898,138 A | * | 2/1990 | Nishimura et al. ......... | 123/399 |
| 5,115,396 A | * | 5/1992 | Keegan ....................... | 123/399 |
| 5,532,929 A | * | 7/1996 | Hattori et al. ............... | 123/361 |
| 5,619,967 A | * | 4/1997 | Streib ......................... | 123/399 |
| 5,746,176 A | * | 5/1998 | Damson et al. ............. | 123/399 |
| 5,775,294 A | * | 7/1998 | Kojima et al. .............. | 123/399 |
| 6,052,644 A | * | 4/2000 | Murakami et al. .......... | 180/179 |
| 6,102,002 A | * | 8/2000 | Gimmler et al. ............ | 123/399 |
| 6,311,670 B1 | * | 11/2001 | Constancis .................. | 123/361 |

FOREIGN PATENT DOCUMENTS

DE 198 56 963 6/2000

* cited by examiner

*Primary Examiner*—Erick Solis
(74) *Attorney, Agent, or Firm*—Walter Ottesen

(57) ABSTRACT

The invention is directed to a method and an arrangement for determining a driver command and especially a kickdown command. This driver command is only detected when the pedal position or a desired value derived therefrom exceeds a pregiven threshold value and when the gradient of the pedal position or the desired value derived therefrom exceeds a pregiven threshold value.

16 Claims, 2 Drawing Sheets

METHOD AND ARRANGEMENT FOR DETERMINING A DRIVER COMMAND

BACKGROUND OF THE INVENTION

U.S. Pat. No. 4,849,896 discloses a procedure for determining a driver command wherein the position of an operator-controlled element, which is actuated by the driver, is determined by means of a measuring device. In the mentioned embodiment, the operator-controlled element is an accelerator pedal. To trigger, for example, a kickdown operation for the transmission control of the motor vehicle, the wanted shift function is triggered when a pregiven threshold value is exceeded by the detected position of the accelerator pedal.

German patent publication 198 56 963 discloses another application of the kickdown shift signal. In this solution, there is a speed limiter which limits the speed to a limit value selected by the driver. This speed limiting function is disabled when a predetermined position is exceeded by the driver input (for example, the accelerator pedal position), that is, when a kickdown shift signal is generated.

It is common to both solutions that, for detecting or generating the kickdown signal, only the driver pedal position value or a signal representing the latter is evaluated.

Another known solution comprises using a mechanical kickdown switch.

SUMMARY OF THE INVENTION

A more precise optimized detection of the kickdown command of the driver is made possible with the utilization of the pedal gradient, that is, the time-dependent trace of the pedal position or a desired value derived therefrom. In this way, the function (switch-off of a drive speed limiter, downshifting of an automatic transmission, et cetera), which is triggered by the kickdown shift signal, is only triggered when a corresponding driver command is reliably detected.

In an advantageous manner, a precise reliable kickdown detection without an additional mechanical kickdown switch is made possible in this way.

It is especially advantageous that the threshold value for the pedal gradient is pregiven as a function of the pedal position or of a desired value derived therefrom. In this way, an adaptation of the kickdown detection is made possible to each driving situation.

It is especially advantageous that the reliability of the kickdown detection is increased by the plausibility of the available signals.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
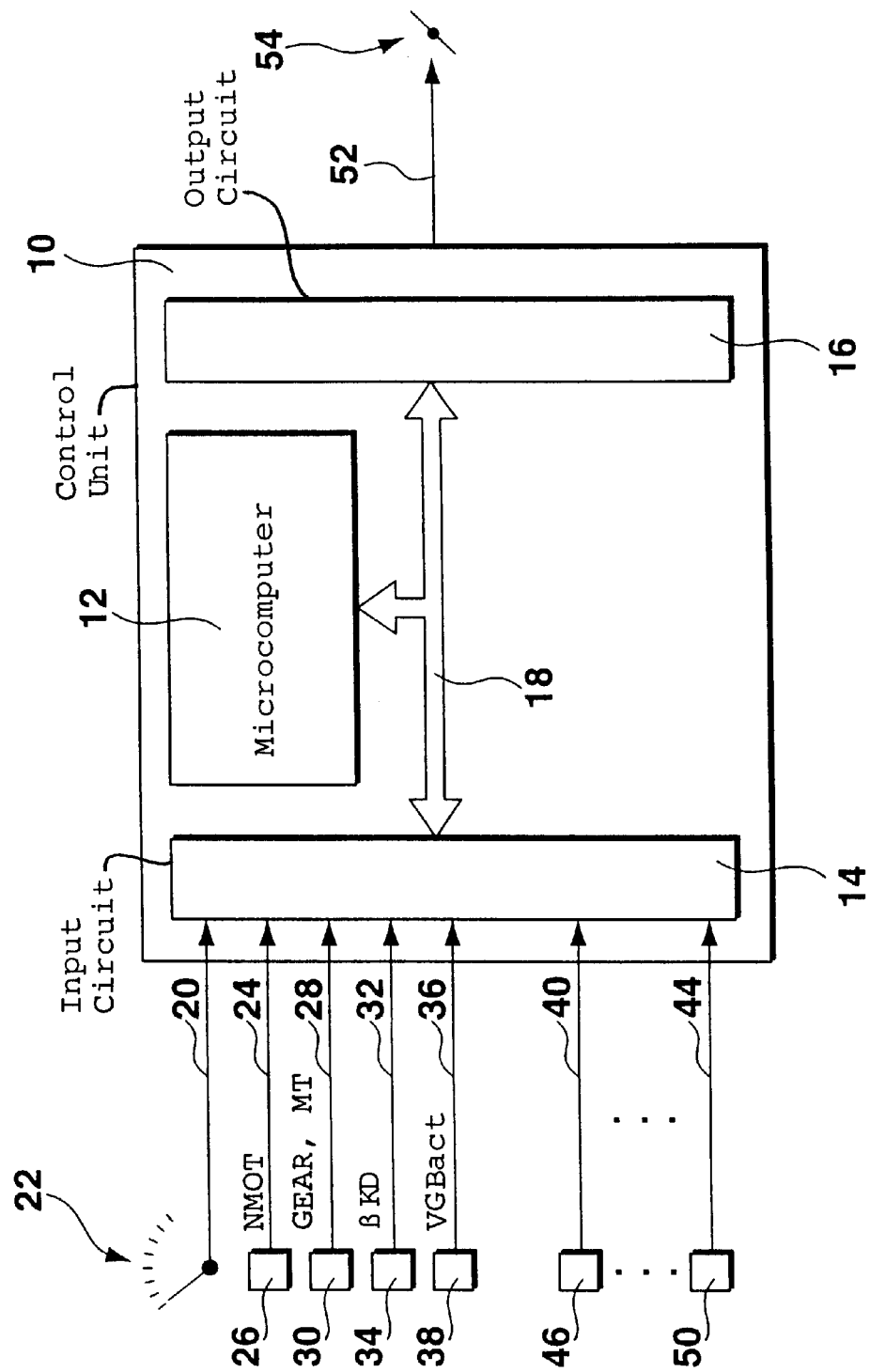
FIG. 1 is an overview block diagram of a control arrangement in the context of a drive speed limiter; and, FIG. 2 is a flowchart showing the described procedure for utilizing the kickdown detection in the control arrangement of FIG. 1.

FIG. 1 shows an electronic control unit 10 for controlling the drive unit of a motor vehicle which includes at least a microcomputer 12, an input circuit 14 and an output circuit 16 and a communications system 18 for connecting these components. Input lines lead to the input circuit 14 and operating variables are transmitted thereby, which are necessary for the engine control and especially for the driving speed limiting or the driving speed control. In another embodiment, the input lines could be combined also into a bus system. An input line 20 connects the input circuit 14 to an operator-controlled element 22 actuable by the driver for the input of the limit speed and to switch on or switch off the limiter. A further input line 24 connects the control unit 10 to a measuring device 26, which detects a signal corresponding to the engine rpm NMOT. An input line 28 connects the input circuit 14 to a measuring device 30 for detecting the set gear or the set transmission ratio and the type of transmission which, for example, can be a manual shift or an automatic transmission. The determination of the set gear or the transmission ratio can take place also within the microcomputer 12 on the basis of engine rpm and road speed. In addition, an input line 32 is provided via which a signal is transmitted to the input circuit 14 from a corresponding measuring device 34 with the signal representing the accelerator pedal position β. A signal VGBACT is supplied via a further input line 36 from a corresponding measuring device 38 and represents the speed of the vehicle. This signal VGBACT is, for example, determined by a corresponding sensor or by a computing unit on the basis of the wheel velocity signals. Input lines 40 to 44 supply signals for additional operating variables to the control unit 10, with these signals being detected by measuring devices 46 to 50. For example, in an internal combustion engine, such operating variables include the position of a throttle flap, the engine temperature, the exhaust-gas composition, the supplied air mass, et cetera. For controlling power, the control unit 10 influences at least an electrically actuable throttle flap 54 and/or the fuel metering via an output line 52 connected to the output circuit 16. In the case of another drive concept such as an electric motor, the corresponding actuating devices are influenced for controlling power.

In addition to the conventional functions for controlling the drive unit, programs are implemented in the microcomputer 12 which limit or control the vehicle speed to a limit value pregiven by the driver. An example of this is shown in the state of the art referred to initially herein. Furthermore, provision is made in a preferred embodiment that programs of the microcomputer 12 determine an adjustment value for the engine on the basis of the accelerator pedal position β and this adjustment value can, for example, comprise a desired throttle flap angle, a desired torque or a desired power which is then adjusted via the control of at least one power actuating device (for example, an electrically actuable throttle flap 54).

The road speed limiter or road speed controller described in the state of the art is disabled with the detection of a kickdown command. Below, a procedure is illustrated based on the flowchart of FIG. 2 as to how such a kickdown command of the driver is reliably detected and without mechanical switching elements. Here, the described procedure is not limited only to the application in combination with road speed limiters or the like, but the procedure can lead to the triggering of a function wherever the start point at least includes the kickdown detection such as a downshift operation of an automatic transmission. As described below, what is essential in the kickdown detection is that the kickdown command of the driver be detected in dependence upon the pedal gradient, that is, the change of the pedal position or of a desired value derived therefrom. Further, it is significant that the threshold value for the pedal gradient is pregiven as a function of the pedal position or of the gradient of a desired value derived from the pedal position. In addition, a plausibility examination of the kickdown detection conditions to each other takes place.

Figure 2:
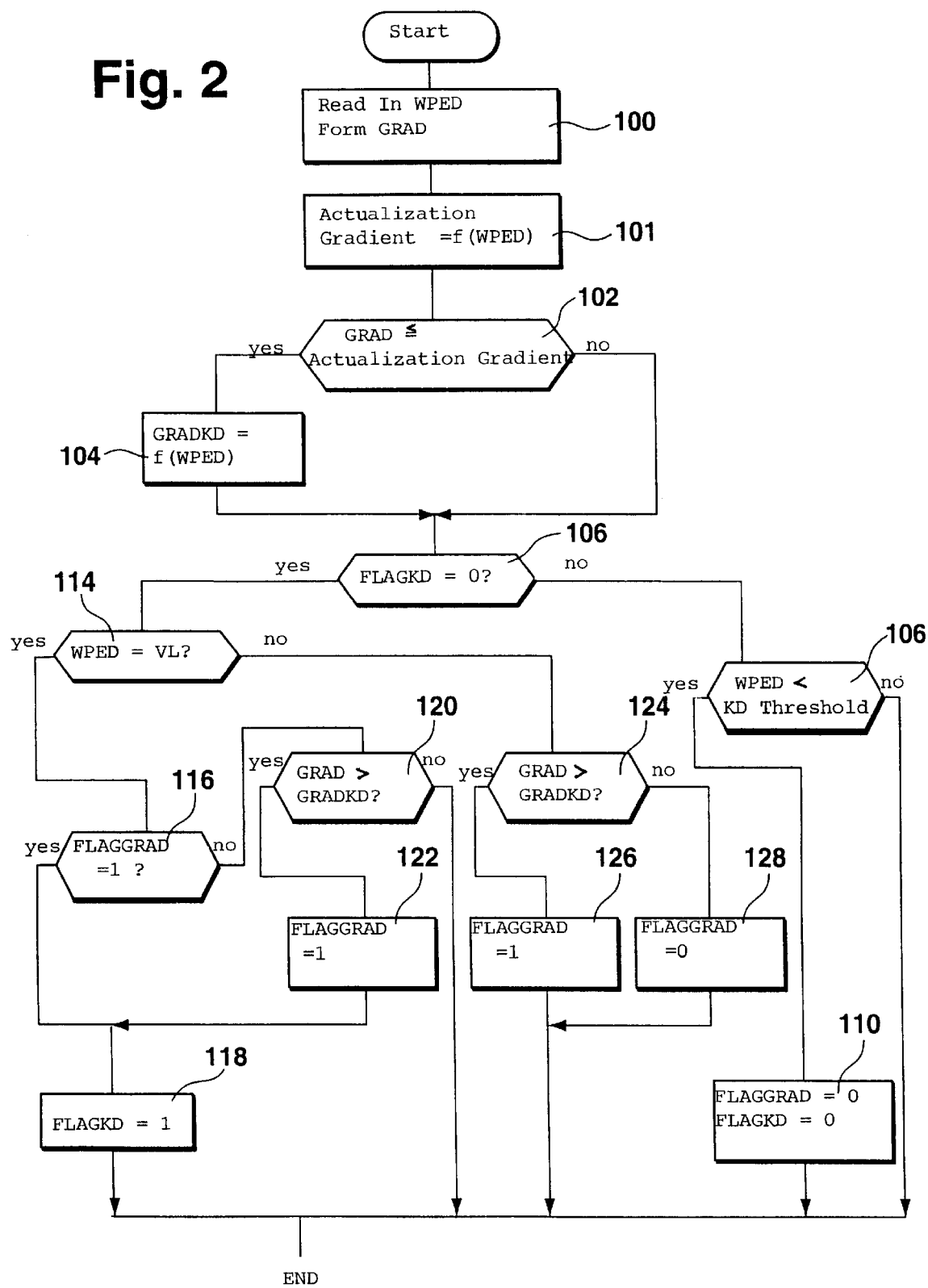

FIG. 2 shows a preferred embodiment of the kickdown detection of the invention as a computer program of the microcomputer 12 of the control unit 10. The computer program is run through cyclically at pregiven time intervals.

In a first step 100, the pedal position WPED or a signal derived therefrom such as a driver command torque, et cetera (in the following referred to as pedal position WPED) is read in and the time-dependent gradient of the signal is formed, for example, via a time-dependent derivation. In step 101, an actualization gradient is formed as a function of the pedal position or of the desired value signal derived therefrom. In the next step 102, a check is made as to whether the gradient is less than this actualization gradient, that is, whether the pedal moves in the direction of its rest position or slowly in the direction of the full-load position or is at rest. If this is the case, then, in step 104, the gradient threshold value GRADKD is formed for kickdown detection as a function of the pedal position or of the desired value signal derived from the pedal position. In the preferred embodiment, a pregiven characteristic line is stored for this purpose and the gradient threshold value reduces with increasing pedal position. In the next step 106, which is also initiated in the case of a negative response in step 102, a first mark FlagKD is checked as to whether it has the value zero. If this mark does have the value zero, then this means that the kickdown was not detected previously. If the value is one, then this means that a kickdown situation has already been detected.

If, in step 106, no kickdown command was detected, the accelerator pedal position or the desired value WPED derived therefrom is compared to a full-load value VL in the next step 114. The full-load value VL corresponds to the full-load value wanted by the driver, that is, the accelerator pedal actuated completely or almost completely. If the pedal position value or the desired value is equal to this full-load value, then, in step 116, a check is made as to whether the gradient mark has the value one, that is, whether the pedal gradient has already up to now exceeded the threshold value. If this is the case, then, in step 118, the kickdown detection mark is set to the value one, that is, the kickdown command of the driver is recognized. If, in step 116, it was determined that the gradient mark has the value zero, then, in step 120, the gradient is compared to the threshold value. If the gradient exceeds the threshold value, then, in step 122, the gradient mark is set to one and then, according to step 118, the kickdown detection mark is set to the value one. If the gradient drops below the threshold value in step 120, then the program is ended and run through anew at the next time point.

If, in step 114, the accelerator pedal position or the desired value derived therefrom has not reached the full-load value, then, in step 124, the gradient is compared to the gradient threshold value. If the gradient exceeds the threshold value, then, in step 126, the gradient mark is set to the value one; in the opposite case, the gradient mark is set to the value zero in step 128. Thereafter, the program is ended.

In the case of a negative response in step 106, that is, when the kickdown command was recognized in the last runthrough, the accelerator pedal position or the desired value derived therefrom is compared to a kickdown threshold value in step 112 as to whether the accelerator pedal position or the desired value drops below the threshold value. If this is the case, then step 110 follows and, if this is not the case, the program is ended as after step 110 and the program is run through anew with step 100 at the next time point. In step 110, the marks FlagGRAD and FlagKD are reset.

This means that, in the case of a kickdown detection with a drop below the threshold value by the accelerator pedal position or the desired value WPED derived therefrom, the gradient mark FlagGRAD and the kickdown detection mark FlagKD are reset; whereas, in a detected kickdown command and an accelerator position or the desired value WPED derived therefrom lying above the threshold, no change of the particular mark takes place.

In this way, a detection of the kickdown command of the driver takes place when the accelerator pedal position or a desired value derived therefrom represents a full-load command and the gradient of the accelerator pedal position or the desired value derived therefrom exceeds a pregiven threshold value. In the preferred embodiment, this threshold value is dependent upon the accelerator pedal position or the desired value derived therefrom. In lieu of a full-load threshold value, in other embodiments, a threshold value deviating from the full-load command is provided in combination with the kickdown command detection.

In another program, when the kickdown command is detected, the shift function connected therewith is carried out, for example, switching off the road speed limiter, switching the transmission, et cetera.

It is understood that the foregoing description is that of the preferred embodiments of the invention and that various changes and modifications may be made thereto without departing from the spirit and scope of the invention as defined in the appended claims.

What is claimed is:

1. A method for determining a driver command, the method comprising the steps of:
    determining the position of an operator-controlled element actuable by the driver and deriving a desired value from said position;
    forming a gradient of said desired value; and,
    detecting said driver command when said position exceeds a pregiven threshold value and when said gradient of said desired value exceeds a pregiven threshold value.

2. The method of claim 1, wherein said operator-controlled element is an accelerator pedal and said position is the position of said accelerator pedal; and, said desired value derived from said position of said accelerator pedal is one of the following: a position desired value and a driver command torque.

3. The method of claim 2, wherein said threshold value for said gradient of said accelerator pedal or of said desired value derived therefrom is dependent upon the pedal position or the desired value derived therefrom.

4. The method of claim 3, wherein said gradient threshold value drops off when said position or said desired value increases.

5. The method of claim 1, wherein said driver command is a kickdown command of the driver which serves to trigger at least one function.

6. The method of claim 5, wherein said function is the switch-off of a road speed limiter and/or a shift operation of an automatic transmission.

7. The method of claim 1, wherein said threshold value is a full-load value.

8. An arrangement for determining a driver command, the arrangement comprising:

an electronic unit for determining a signal representing a position of an operator-controlled element and a desired value derived therefrom;

said electronic unit including means for determining said driver command to trigger a function only when said signal exceeds a pregiven threshold value and when; the gradient of said desired value exceeds a pregiven threshold value.

9. A method for determining a driver command, the method comprising the steps of:

recognizing said driver command when one of the position of an operator-controlled element and a desired value derived from said position exceeds a pregiven threshold value; and, when, in addition, one of the gradient of said position of said operator-controlled element and the gradient of said desired value exceeds a pregiven threshold value.

10. The method of claim 9, wherein said operator-controlled element is an accelerator pedal and said position is the position of said accelerator pedal; and, said desired value derived from said position of said accelerator pedal is one of the following: a position desired value and a driver command torque.

11. The method of claim 10, wherein said threshold value for said gradient of said accelerator pedal or of said desired value derived therefrom is dependent upon the pedal position or the desired value derived therefrom.

12. The method of claim 11, wherein said gradient threshold value drops off when said position or said desired value increases.

13. The method of claim 9, wherein said driver command is a kickdown command of the driver which serves to trigger at least one function.

14. The method of claim 13, wherein said function is the switch-off of a road speed limiter and/or a shift operation of an automatic transmission.

15. The method of claim 9, wherein said threshold value is a full-load value.

16. An arrangement for determining a driver command for triggering a function, the arrangement comprising:

a control unit for determining one of a signal representing the position of an operator-controlled element and a desired value derived from said signal;

said control unit including means for determining said driver command for triggering said function when one of said signal and said desired value exceeds a pregiven threshold value; and, said control unit including ancillary means for only then recognizing said driver command when, in addition, one of the gradient of said signal representing said position and the gradient of said desired value derived from said signal exceeds a pregiven threshold value.

* * * * *

UNITED STATES PATENT AND TRADEMARK OFFICE
CERTIFICATE OF CORRECTION

PATENT NO.    : 6,779,507 B2
DATED         : August 24, 2004
INVENTOR(S)   : Marcus Kammerer, Andreas Schmidt and Thomas Frey It is certified that error appears in the above-identified patent and that said Letters Patent is hereby corrected as shown below:

<u>Column 5,</u>
Line 6, delete "when;" and insert -- when -- therefor.

Signed and Sealed this

Twenty-third Day of November, 2004

JON W. DUDAS
*Director of the United States Patent and Trademark Office*